United States Patent Office 3,202,004
Patented Aug. 24, 1965

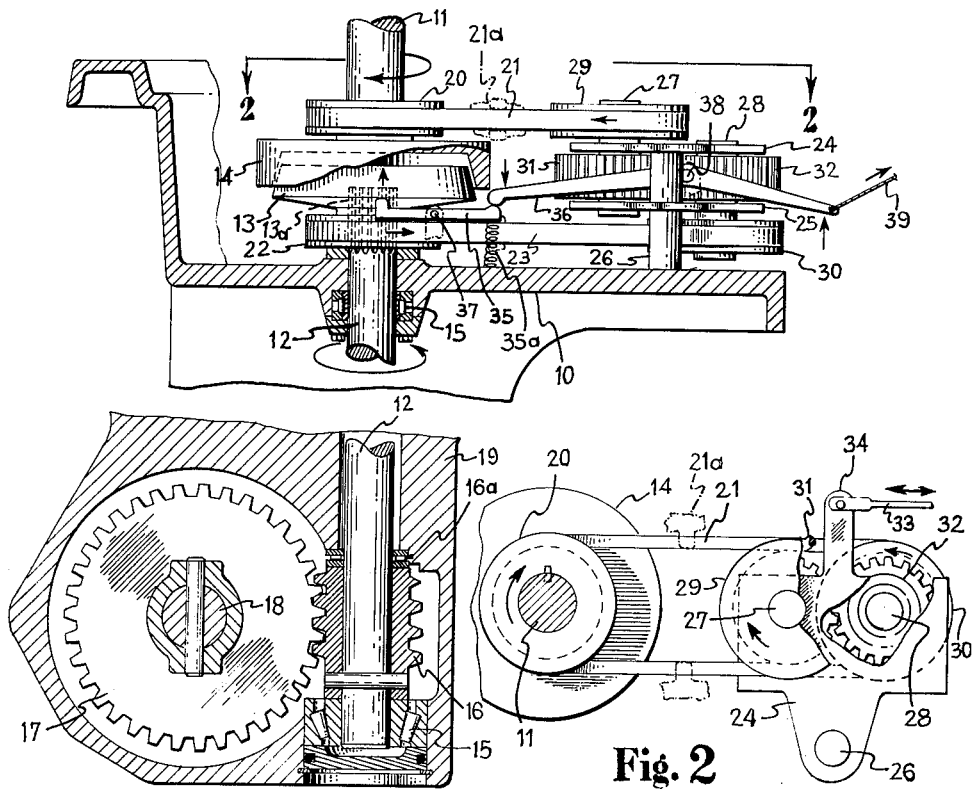
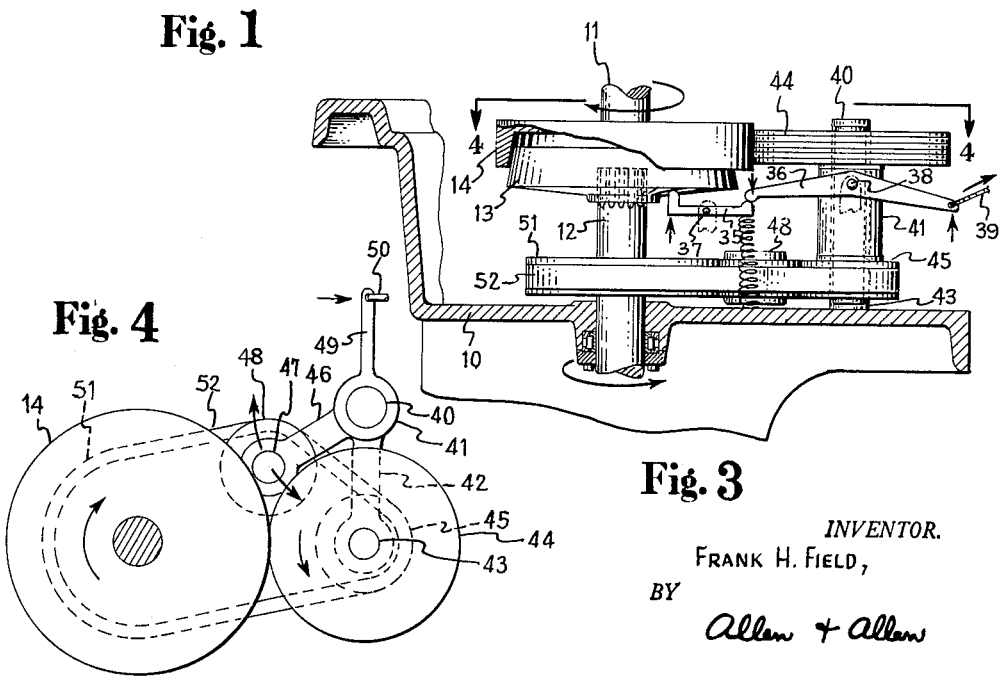
INVENTOR.
FRANK H. FIELD,
BY
Allen + Allen
ATTORNEYS.

3,202,004
REVERSE FOR WORM DRIVE, DIRECT DRIVE TILLER
Frank H. Field, Cincinnati, Ohio, assignor, by mesne assignments, to Magna American Corporation, Evendale, Cincinnati, Ohio, a corporation of Ohio
Filed May 19, 1961, Ser. No. 111,323
2 Claims. (Cl. 74—220)

This invention resides in the provision of a reverse for a worm drive, direct drive tiller.

In recent years, motorized, home garden tillers have become very popular. One of the more popular of these tillers has been one which employs a direct drive between the engine shaft and the tiller shaft, and a worm and worm gear between the tiller shaft and the tine shaft. Heretofore, however, there has been no satisfactory means provided by which the tine shaft of such a tiller could be reversed as is sometimes necessary and desirable when one is working in close quarters, near walks and fences, and in other similar situations.

Accordingly, a primary object of this invention is to provide means which are both simple to operate and economical to manufacture for effecting the reverse drive of a tiller tine shaft.

A further object of the invention is to provide a reverse which is particularly well suited for tillers employing a tine shaft which is driven directly through a worm and worm gear.

These and other objects of the invention will become apparent to those skilled in the art from a reading of the description to follow, in light of the above remarks, and with reference to the accompanying drawings, in which drawings like numerals are employed to designate like parts throughout, and in which:

FIGURE 1 is an exploded, fragmentary section of a tiller to which the invention is applied, including also the invention itself, FIGURE 2 is a fragmentary section taken on the line 2—2 of FIGURE 1, FIGURE 3 is a fragmentary section of a portion of tiller mechanism to which a modification of the invention has been applied, including the modification itself, and FIGURE 4 is a fragmentary section taken on the line 4—4 of FIGURE 3.

Referring now to FIGURES 1 and 2, the preferred form of the invention will be described. The base frame and housing of the tiller which incorporates the invention is designated at 10. A motor, not shown, will be mounted on this frame and it will be understood that this motor will drive the engine shaft or drive shaft 11. This shaft 11 is rotating in a clockwise direction as viewed in FIGURES 1 and 2. The tiller shaft 12 may also be driven in a clockwise direction, as viewed in these same figures, by power derived through the engine shaft 11 by means of the clutch elements 13 and 14. The position of the parts illustrated in FIGURE 1, however, is that which will be assumed when the reverse mechanism is brought into play which means, therefore, that the tiller shaft 12 will be turning in a counterclockwise direction, when the parts are in position for reverse movement of the tiller, as indicated.

The upper and lower ends of the tiller shaft 12 are journaled in suitable bearings generally indicated at 15. Pinned adjacent the lower end of the shaft 12 is a worm 16. This worm 16 engages a worm gear 17 which is fixed on the tine shaft 18. The worm 16 and worm gear 17 are enclosed within the housing 19 which in reality is a part of the frame structure 10. It will be understood that the tines, not shown, are fixed on the shaft 18 at either side of the housing 19. A thrust bearing 16a is also provided above the worm 16.

Assuming that the clutch parts 13 and 14 are engaged and that the mechanism for producing reverse movement of the tiller is in its relaxed condition, all as will be explained shortly, clockwise rotation of the drive shaft 11 by the tiller engine will provide clockwise rotation of the tiller shaft 12 and its worm 16. This will result in the worm gear 17 and shaft 18 being rotated in a counterclockwise direction as viewed in FIGURE 1. This results in forward rotation of the tines on the tine shaft 18, and, of course, forward rotation of the tiller considered as a complete unit. Thus, as viewed in FIGURE 1, the forward part of the tiller unit is at the left and the rear part at the right.

The clutch part 14 is fixed on the engine shaft 11. The clutch part 13 is positioned on the tiller shaft 12 by means of splines 13a so that it will rotate with the shaft 12 but so that it may slide up and down thereon. Fixed on the engine shaft 11 is a pulley 20 having a V-belt 21 thereon. Fixed on the tiller shaft 12 is a pulley 22 having a V-belt 23 thereon.

The reverse mechanism for the tiller unit includes a pair of plates 24 and 25 which are mounted on a common pivot shaft 26 which has a suitable bearing in the frame structure 10. The plates 24 and 25 are arranged to move as a unit. Mounted in these plates 24 and 25 are two shafts 27 and 28. These shafts are both freely rotatable in the bearing plates 24 and 25. Fixed on the upper end of the shaft 27 is a pulley 29. Fixed on the lower end of the shaft 28, beneath the plate 25, is a pulley 30. The pulley 29 is engaged by the V-belt 21 previously mentioned and the pulley 30 is engaged by the V-belt 23 also previously mentioned. Preferably the pulley 29 is adjustable and to this end one half of the pulley is screwed onto the hub of the other half. When these pulley halves are moved towards one another the belt 21 is tightened in that it rides farther out on the perimeter of the pulley; similarly, when the halves of the pulley 29 are moved away from one another the belt is loosened.

Fixed on the shaft 27 between the plates 24 and 25 is a gear 31. Fixed on the shaft 28, also between the plates 24 and 25, is a gear 32 which meshes with the gear 31.

From the foregoing it will be apparent that the relative position of the plates 24 and 25, the shafts 27 and 28, the pulleys 29 and 30, and the gears 31 and 32 always remain the same. These parts, as a unit, may all be pivoted about the shaft 26. This is accomplished by a lever or cable 33, see FIGURE 2, which engages an arm 34 on the upper plate 24. It will be understood that the member 33 will terminate at a position convenient to the operator so that the operator may push the arm 34 to the left as viewed in FIGURE 2, which results in counterclockwise movement of the plates 24, 25 and related mechanism about the shaft 26, or pull this arm 34 to the right, as also viewed in FIGURE 2, which results in the plates 24, 25 and related mechanism being moved in a clockwise manner about the shaft 26. Belt guides, such as generally indicated at 21a, are provided for the belts 21 and 23 so that these belts will remain in their normal position so that the pulleys 29 and 30 will move away from these belts when the member 33 is pushed to the left as viewed in FIGURE 2.

Movement of the clutch part 13 which is slidable on the tiller shaft 12 is controlled by a pair of levers 35 and 36 which are pivotally mounted in the frame structure 10 as generally indicated at 37 and 38 respectively. The left hand end of the lever 35, as viewed in FIGURE 1, is connected to the bottom of the clutch part 13. The left hand end of the lever 36, as viewed in this same figure, bears against the upper portion of the right hand end of the lever 35. A spring 35a normally urges the lever 35 in a counterclockwise direction about the pivot 37, thus normally urging the clutch part 13 out of contact with the clutch part 14. A cable 39 is attached to the right hand end of the lever 36. When tension on the member 33 is relaxed so that the V-belts 21 and 23 are relaxed, as will normally be the case, the operator, by pulling on the cable 39, and assuming that the engine is turned on and rotating its drive shaft 11 in the direction explained and indicated, will rock the shaft 36 in a counterclockwise direction about the pivot 38, as viewed in FIGURE 1. This results in the left hand end of the lever 36 pushing down on the right hand end of the lever 35 whereby this lever 35 is rotated in a clockwise direction about its pivot 37 against the spring 35a. This in turn results in the left hand end of the lever 35, which is connected to the clutch part 13, sliding this clutch part 13 on the shaft 12 and into engagement with the clutch part 14 which is fixed to the engine shaft 11. In this manner the engine shaft 11 will drive the tiller shaft 12 in a clockwise direction which will produce counterclockwise movement of the tine shaft 18 through the worm 16 and worm gear 17, whereby to rotate the tiller in a forward direction, to the left as viewed in FIGURE 1, as earlier explained.

Reverse movement of the tiller is obtained as follows. The operator will let up on the cable 39 whereby the clutch part 13 is moved downwardly on the tiller shaft 12 by reason of spring 35a acting on the lever 35 whereby this part 13 will be disengaged from the clutch part 14 and clockwise rotation of the tiller shaft 12 will terminate. If the operator then pulls on the member 33 so as to move the arm 34 and its plate 24, and the mechanism carried by the plates 24 and 25, in a clockwise direction about the shaft 26, as viewed in FIGURE 2, the V-belts 21 and 23 will be drawn taut. When the V-belt 21 is thus drawn taut, the pulley 29, and the shaft 27 to which it is fixed, will be rotated in a clockwise direction via the belt 21, pulley 20 and engine shaft 11. Such clockwise movement of the shaft 27 will also produce clockwise movement of the gear 31 which is fixed thereto. Clockwise movement of the gear 31, however, will produce counterclockwise movement of the gear 32 with which it meshes, and which gear is fixed on the shaft 28. Accordingly, the shaft 28 will thus be rotated in a counterclockwise direction and so will the pulley 30 which is fixed thereto. The V-belt 23 now also being taut, counterclockwise movement of the pulley 30 will result, via this belt 23, in counterclockwise movement of the pulley 22 and the tiller shaft 12 to which the pulley 22 is fixed. This, of course, will result in counterclockwise movement of the worm 16 and clockwise movement of the worm gear 17, whereby the tine shaft 18 is also rotated in a clockwise direction to produce similar rotation of the tines which, as earlier explained, result in rearward movement of the tiller unit proper.

It is believed that the operation of the invention as embodiment in the structure of FIGURES 1 and 2 has been made clear from the foregoing description with reference to these figures.

A modification of the invention is illustrated in FIGURES 3 and 4 wherein like parts will receive designations corresponding to those employed in the embodiment of FIGURES 1 and 2 above described. In the modification of FIGURES 3 and 4, reverse movement of the tiller, assuming that the cable 39 is relaxed so that the clutch part 13 is disengaged from the clutch part 14, is obtained as follows.

A control shaft 40 is fixed in the frame structure 10. A sleeve 41 is rotatable about this shaft 40. An arm 42 extending from and fixed to the sleeve 41 has a suitable bearing for a shaft 43. Fixed on the upper end of the shaft 43 is a friction wheel 44. Fixed on the lower end of the shaft 43 is a pulley 45.

Also extending from the sleeve 41 and fixed thereto is an arm 46. This arm 46 carries a stub shaft 47 on which is mounted a pulley 48. Also extending from the sleeve 41, see FIGURE 4, is a control arm 49 to which a control member 50 is fastened. The other end of the member 50 will be disposed convenient to the operator in a manner similar to the described in connection with the member 33 of the modification shown in FIGURE 2.

Fixed on the tiller shaft 12 is a pulley 51. A V-belt 52 engages the pulleys 51 and 45 and also the pulley 48 which serves as a belt tightener as will be described.

The operation of the reverse mechanism shown in FIGURES 3 and 4 is as follows: When the cable 39 is relaxed so that the clutch part 13 is disengaged from the clutch part 14, and when the member 50 has been actuated so as to move the control arm 49 in a clockwise direction about the control shaft 40, the resulting position of the various parts will produce reverse movement of the tiller, and this is the position of parts indicated in FIGURES 3 and 4.

Clockwise movement of the arm 49 also resulted in clockwise movement of the sleeve 41 and its pair of arms 42 and 46. This resulted in the friction wheel 44 being brought into firm engagement with the periphery of the clutch part 14. At the same time the belt tightener pulley 48 moved an amount sufficient to make the V-belt 52 taut on the pulleys 45 and 51.

From the arrangement obtained in the manner just described, which is that shown in FIGURES 3 and 4, it will be apparent that the tiller shaft 12 is driven in a counterclockwise direction as indicated, through the motor and its drive shaft 11, clutch part 14 which is fixed to the drive shaft 11, friction wheel 44 which bears firmly against this clutch part 14, shaft 43 to which the friction wheel 44 is fixed, pulley 45 which is also fixed to the shaft 43, V-belt 52 and the pulley 51 which is fixed to the tiller shaft 12, this belt 52 being taut by reason of the position of the pulley 48. As will be readily apparent, clockwise rotation of the clutch part 14 results in counterclockwise rotation of the friction wheel 44, counterclockwise rotation of the shaft 43 and pulley 45, and counterclockwise rotation of the pulley 51 and tiller shaft 12.

Reverse movement of the tiller as effected by the mechanism of FIGURES 3 and 4 may be terminated by actuating the member 50 so as to move the arm 49 in a clockwise direction as viewed in FIGURE 4. This results in movement of the sleeve 41 and its arms 42 and 46 so as to greatly reduce the friction between clutch part 14 and wheel 44, and so as to make the V-belt 52 slack upon the pulleys 45 and 51. Forward movement of the tiller is then obtained by actuating the member 39 so as to move the clutch part 13, through the levers 36 and 35, into engagement with the clutch part 14 whereafter the engine shaft 11 to which the clutch part 14 is fixed will drive the tiller shaft 12, to which the clutch part 13 is fixed, in a clockwise direction.

It is believed that the modification of FIGURES 3 and 4 has also been fully explained in the foregoing passages.

It is to be understood that further modifications may be made in the invention without departing from the scope and spirit thereof. It is also to be understood that while the invention has been shown as embodied in certain particular arrangements and structures, such invention is not to be limited to these arrangements and structures except insofar as they are specifically set forth in the subjoined claims.

Having thus described the invention, what is claimed as new and what is desired to be protected by United States Letters Patent is:

1. In a garden tiller comprising a tine shaft, an engine shaft, a tiller shaft in axial alignment with said engine shaft, and a direct worm gear drive from said tiller shaft to said tine shaft for driving said tine shaft in a forward direction, the improvement which comprises: means to effect a reverse drive of said tine shaft by said engine shaft and by said direct worm gear drive, said means including a first clutch part fixed to said engine shaft; a second clutch part slidable on said tiller shaft into and out of engagement with said first clutch part; a first pulley rotatable with said first clutch part; a second pulley rotatable with said second clutch part; and other means, effective when said second clutch part is out of engagement with said first clutch part, connected between said first and second pulleys, to cause said second clutch part to rotate in a direction opposite from the direction of said first clutch part, said other means comprising a first auxiliary pulley, a second auxiliary pulley, a pair of gears which mesh together, one of said gears being connected to said first auxiliary pulley and the other of said gears being connected to said second auxiliary pulley, first belt means engaging said first pulley and said first auxiliary pulley, second belt means engaging said second pulley and said second auxiliary means, and means for moving said auxiliary pulleys and said gears as a unit to tighten said first and second belt means when said second clutch part is out of engagement with said first clutch part, and for moving said auxiliary pulleys and said gears as a unit to loosen said first and second belt means when said second clutch part is in engagement with said first clutch part.

2. In a garden tiller comprising a tine shaft, an engine shaft, a tiller shaft in axial alignment with said engine shaft, and a direct worm drive from said tiller shaft to said tine shaft for driving said tine shaft in a forward direction, the improvement which comprises: means to effect a reverse drive of said tine shaft by said engine shaft and by said direct worm gear drive, said means including a first clutch part fixed to said engine shaft; a second clutch part slidable on said tiller shaft into and out of engagement with said first clutch part; a friction wheel engageable with said first clutch part; a pulley rotatable with said second clutch part; and other means, effective when said second clutch part is out of engagement with said first clutch part, connected between said friction wheel and said pulley, to cause said second clutch part to rotate in a direction opposite from the direction of rotation of said first clutch part, said other means comprising an auxiliary pulley rotatable with said friction wheel, belt means engaging said pulley and said auxiliary pulley, and a control member for moving said friction wheel into engagement with said first clutch part and for making said belt means taut when said second clutch part is out of engagement with said first clutch part, and for moving said friction wheel out of engagement with said first clutch part and for releasing said belt means when said second clutch part is in engagement with said first clutch part.

References Cited by the Examiner
UNITED STATES PATENTS

| | | | |
|---|---|---|---|
| 1,763,645 | 6/30 | Caldwell | 74—425 X |
| 2,185,537 | 1/40 | Brownlee | 74—376 |
| 2,299,553 | 10/42 | Carlson et al. | 74—376 |
| 2,912,871 | 11/59 | Velkoff | 74—203 |

DON A. WAITE, *Primary Examiner.*